United States Patent [19]
Baba et al.

[11] Patent Number: 4,712,882
[45] Date of Patent: Dec. 15, 1987

[54] VARIABLE FOCAL LENGTH LENS

[75] Inventors: Takeshi Baba, Yokohama; Hiroyuki Imataki, Kawasaki; Masayuki Usui; Takashi Serizawa, both of Yokohama; Hiroyasu Nose, Tokyo, all of Japan

[73] Assignee: Canon Kabushiki Kaisha, Tokyo, Japan

[21] Appl. No.: 686,756

[22] Filed: Dec. 27, 1984

[30] Foreign Application Priority Data

Jan. 5, 1984 [JP] Japan ............................. 59-45

[51] Int. Cl.⁴ .................... G02B 15/00; G02B 3/14
[52] U.S. Cl. .............................. 350/413; 350/419; 350/423
[58] Field of Search ............... 350/413, 418, 419, 423

[56] References Cited

U.S. PATENT DOCUMENTS

| | | | |
|---|---|---|---|
| 3,486,808 | 12/1969 | Hamblen | 350/413 |
| 3,816,160 | 6/1974 | Moore | 350/413 X |
| 4,444,471 | 4/1984 | Ford, Jr. et al. | 350/419 X |

OTHER PUBLICATIONS

Ohtsuka et al; "Studies on the Light-Focusing Plastic Rod"; *Applied Optics*; vol. 22, No. 3; pp. 413–417.
Caudell et al; "Active Optics with RTV Silicone Rubber"; *SPIE*; vol. 115, Advances in Replicated & Plastic Optics, San Diego, CA; Aug. 23-24, 1977; pp. 18-24.

*Primary Examiner*—Bruce Y. Arnold
*Assistant Examiner*—Scott J. Sugarman
*Attorney, Agent, or Firm*—Fitzpatrick, Cella, Harper & Scinto

[57] ABSTRACT

A variable focal length lens in which a lens comprising a transparent elastic member having a non-uniform distribution of refractive index is adapted to be deformed by an extraneous force.

8 Claims, 6 Drawing Figures

DISTRIBUTION OF REFRACTIVE INDEX

VARIABLE FOCAL LENGTH LENS

BACKGROUND OF THE INVENTION

1. Field of the Invention

This invention relates to a variable focal length lens in which the refractive power of a single lens itself can be fluctuated.

2. Description of the Prior Art

As a variable focal length lens of this type, there is known one in which the shape of the refracting surface is varied by deformation of an elastic member constituting the lens or by a variation in the pressure of liquid enclosed in an elastic film as shown in U.S. Pat. No. 3,664,727, or one in which the refractive index of the lens medium itself is varied by the use of liquid crystal or the like as shown in U.S. Pat. No. 4,190,330. However, the one in which the shape of the refracting surface is varied has a disadvantage that the variation in the shape is complicated and the control thereof is difficult, and the one in which the refractive index of the lens medium is varied has a disadvantage that the variable amount of the refractive power is small.

SUMMARY OF THE INVENTION

It is an object of the present invention to overcome the above-noted disadvantages and to provide a variable focal length lens in which the variable amount of the refractive power is great and can be easily controlled. Such variable focal length lens is basically comprised of a transparent elastic member having in advance a non-uniform distribution of refractive index therein, and means for deforming the elastic member.

In the lens according to the present invention, use is made of an elastic member having a variation in refractive index in at least a direction perpendicular to the optic axis. Accordingly, the lens may also have a distribution of refractive index in a direction parallel to the optic axis.

DESCRIPTION OF THE PREFERRED EMBODIMENTS

Figure 1:
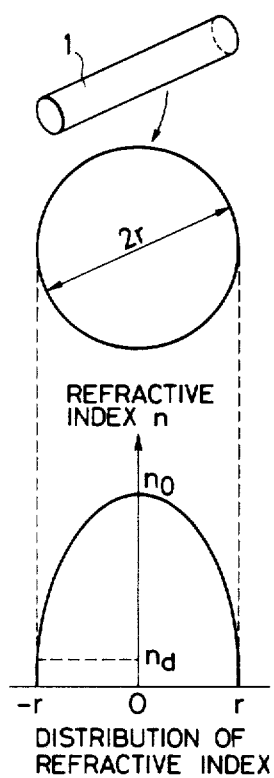
FIG. 1 shows a known rod glass type lens body and the distribution of refractive index in the cross-section thereof.

Generally, a medium whose refractive index differs from location to location is called a nonuniform medium, and as an example of a lens member formed of such medium, there is a convergent rod lens 1 shown in FIG. 1. The distribution of refractive index on the cross-section 1a of this convergent rod lens 1 forms such a square distribution substantially parabolic symmetrically about the center axis of the lens that the refractive index at the center of the lens is $n_0$ and the refractive index in the marginal portion r of the lens is nd.

Figure 2A:
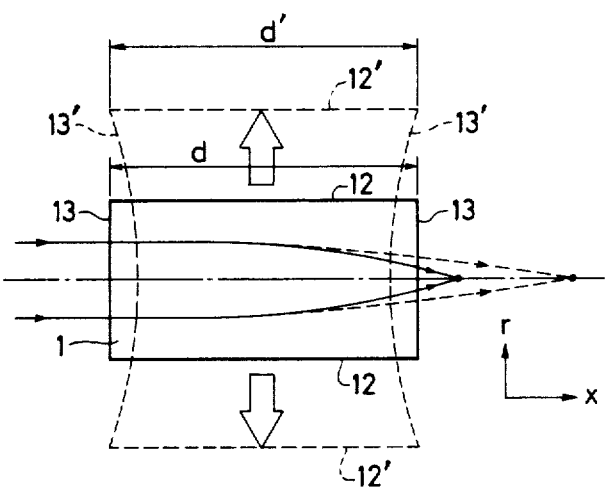
FIGS. 2A and 2B illustrate the basic principle of the present invention.

The principle of the variable focal length lens according to the present invention will hereinafter be described by reference to FIG. 2. In FIG. 2A, reference numeral 11 designates a cylindrical transparent elastic member and, when the position in this elastic member is represented with x as the direction of the center axis and r as the direction of the radius vector as shown, the refractive index $n(r)$ at a point x,r in the elastic member is constant in the direction of the axis as shown, for example, in FIG. 2B and depends only on r, and a nonuniform distribution of refractive index (approximate to a quadratic curve) as generally represented by $$n(r) = n_0\left(1 - \frac{A}{2}r^2\right)$$

is formed in advance. In the above equation, $n_0$ is the refractive index on the center axis and A is a constant. ($A > 0$)

Such a distribution of refractive index can be obtained by diffusion of different molecules or ions or, in the case of synthetic rubber or the like, by a method of making the distribution of molecular weight non-uniform by control of the temperature distribution or the like during the molding.

The surface 12 of such elastic member 11 is pulled to a position 12′ in the direction of the arrows as shown in FIG. 2A by means, not shown, whereby the elastic member is deformed as indicated by broken lines in FIG. 2A.

Figure 2B:
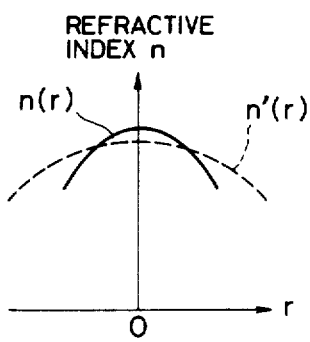

The distribution of refractive index $n'(x,r)$ in the elastic member so deformed assumes the distribution as indicated by a broken line in FIG. 2B and can be approximately expressed as $$n'(x,r) = n_0'\left(1 - \frac{A'}{2}r^2\right).$$

If the length of the elastic member 11 before being deformed in x direction is d and the length of the elastic member 11 after being deformed is d′, a medium having such a non-uniform distribution of refractive index has a refractive power as is well known and when A and A′ are positive, the refractive power $\phi$ of the elastic member before being deformed is given by $\phi = An_0\sin(Ad)$ and the refractive power $\phi'$ of the elastic member after being deformed is given by $\phi' = A'n_0'\sin(A'd')$. By the deformation s indicated by broken lines in FIG. 2A, the gradient of the refractive index becomes gentle and therefore $A' < A$ and $d' < d$ and thus, $\phi' < \phi$, and the refractive power is reduced by the deformation as shown. As can be seen from FIG. 2A, the side surfaces 13 of the elastic member 11 are also deformed as indicated by broken lines, whereby they form concave surfaces, and this acts in a direction to further reduce the refractive power of the elastic member and therefore, the variable amount of the refractive power becomes greater. Also, according to a method which will later be described, it is also possible to eliminate the influence of such secondary surface deformation.

When a tension is imparted in the direction of the radius vector of the elastic member 11 as shown in FIG. 2A, the variation in the gradient A of the refractive index is greater than the variation in the length d, but when a tension or pressure is imparted in the axial direction of the elastic member 11, the variation in the length d causes a variation in the refractive power.

The simplest method of correcting the influence of the secondary surface deformation is to use the so-called liquid immersion method, that is, the elasic member 11 may be immersed in a liquid having the same refractive index as the refractive index of the elastic member. If this is done, the influence of the surface deformation can be greatly reduced although it cannot be completely eliminated, because the elastic member 11 has a non-uniform distribution of refractive index.

Figure 3:
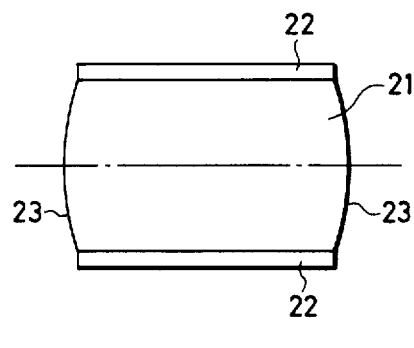
FIGS. 3 and 4 are cross-sectional views showing a first and a second embodiment, respectively, of the variable focal length lens according to the present invention.

Referring to FIG. 3 which is a cross-sectional view of a first embodiment of the present invention, reference numeral 21 designates the aforedescribed elastic member in which the distribution of refractive index is pre-formed, and reference numeral 22 denotes a cylindrical piezo element surrounding the elastic member 21. By applying a voltage to the piezo element 22, the inner diameter thereof can be varied. For example, when the inner diameter of the piezo element has become smaller, the surface 23 of the elastic member 21 which lies at the open end of the cylindrical piezo element become more convex than shown and, if the distribution of refractive index pre-formed in the elastic member 21 as previously described has a positive refractive power, the positive refractive power becomes stronger and the refractive power is greatly varied as a whole.

Figure 4:
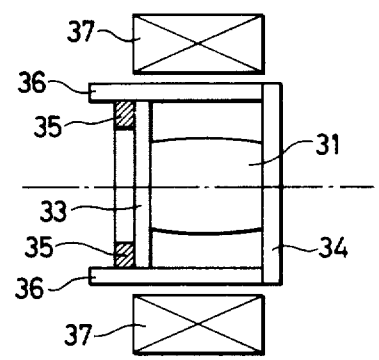

Referring to FIG. 4 which is a cross-sectional view of a second embodiment of the present invention, the aforedescribed elastic member 31 in which the refractive power is pre-formed has its opposite ends adhesively secured to two glass plates 33 and 34. Reference numeral 36 designates a cylindrical container. The glass plate 34 is fixed to the container 36, and the glass plate 33 is movable along the inner wall of the container 36 with a ring-like ferromagnetic member 35 adhesively secured to the glass plate 33. Reference numberal 37 denotes a coil forming an electromagnet.

When a current flows to the coil 37, the gradient of the magnetic field in the vicinity of the ferromagnetic member 35 is varied in accordance with the amount of the current, and the ferromagnetic member 35 and the glass plate 33 are both moved to the left and right in the plane of the drawing sheet. By such movement of the glass plate 33, deformation can be imparted to the elastic member 31 to thereby vary the refractive power thereof. Other means for imparting deformation to the elastic member may be any means such as mechanical means such as a screw or a cam, a stepping motor, or volume variation such as thermal expansion or the like.

As the elastic member used in the present invention, a material having so-called high elasticity is desirable and for example, silicone rubber, ethylene propylene rubber or the like is best suited in respect of the degree of transparency. In such high-elasticity ruber, the Poisson's ratio is as high as 0.45-0.49 and volume variation is small. Accordingly, the refractive index at each point in the elastic member is hardly varied before and after the elastic member is deformed, and the refractive index is determined by only the movement of each point resulting from the deformation and for example, the aforementioned $n_0$, $A$, $n_0'$ and $A'$ are in the relation that $n_0' \approx n_0$ and $A'n_0'r_0'^2 \approx A n_0 r_0^2$, where $r_0$ and $r_0'$ are the radii of the elastic member before and after deformed.

From such approximation, it can be seen that in the variable focal length lens of the present invention, the fluctuation of chromatic aberration during the variation in the focal length can be minimized.

For example, let it be assumed that the distribution of refractive index for d-line before deformation is represented by $$n(r) = n_0\left(1 - \frac{A}{2}r^2\right)$$

and that the distribution of refractive index for g-line before deformation is represented by $$\tilde{n}(r) = \tilde{n}_0\left(1 - \frac{\tilde{A}}{2}r^2\right)$$

It is known that $n_0$ and $\tilde{n}_0$ assume different values determined by the dispersion characteristic of the elastic member, but the coefficients $A$ and $\tilde{A}$ of the gradient of refractive index can be controlled to a certain degree by the type of ions or molecules diffused or exchanged in the elastic member. Assuming that the lens length d is small, the refractive powers $\phi d$ and $\phi g$ for d-line and g-line before deformation are represented as $\phi d \approx n_0 A d$ and $\phi g \approx \tilde{n}_0 \tilde{A} d$. Accordingly, by controlling $\tilde{A}$ so that $n_0 A \approx \tilde{n}_0 \tilde{A}$, achromatization can be accomplished in the state before deformation.

When deformation is imparted to the elastic member from such a state, the distributions of refractive index for d-line and g-line, respectively, are $$n'(r) = n_0'\left(1 - \frac{A'}{2}r^2\right)$$

$$\tilde{n}'(r) = \tilde{n}_0'\left(1 - \frac{\tilde{A}'}{2}r^2\right)$$

but from $n_0' \approx n_0$ and $\tilde{n}_0' \approx \tilde{n}_0$ and $A'n_0'r_0'^2 \approx A n_0 r_0^2$ and $\tilde{A}'\tilde{n}_0'r_0'^2 \approx \tilde{A}\tilde{n}_0 r_0^2$, $\phi d' \approx n_0'A'd' \approx \tilde{n}_0'\tilde{A}'d' \approx \phi g'$, where $\phi d'$ and $\phi g'$ are the refractive porwers for d-line and g-line after deformation, and it can be seen that the achromatized state is kept even after deformation. This is an effect which would not be obtained unless there are at least two variable surfaces in a lens of variable surface shape such as a liquid lens or the like.

To form a distribution of refractive index in such an elastic member, a method of polymerizing the elastic member with the ambient different molecular vapor in a gel state of low bridging density as shown in Y. Ohtsuka and T. Sugano: *Applied Optics*, 22, pages 413–417 (1983) is effective. Also, in the gel state, the elasic modulus is low and great deformation can be obtained by a small force.

Figure 5:
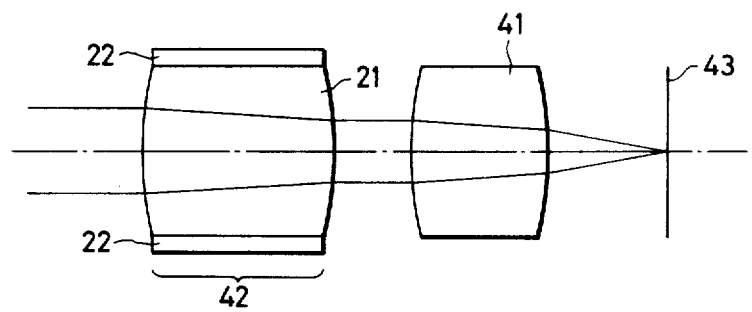
FIG. 5 shows an example of the construction in a case where the variable focal length lens according to the present invention is applied as the pickup objective lens of an optical memory disc.

FIG. 5 schematically shows an example of the construction in a case where the present invention is applied as the pickup objective lens of an optical memory disc.

Reference numeral 41 designates a fixed focal length lens, and reference numeral 42 denotes the variable focal length lens of the present invention which uses the construction of FIG. 3. Reference numeral 43 designates the recording surface of an optical recording medium. The laser light having entered from the left as viewed in FIG. 5 is condensed on the recording surface 43 by the lenses 42 and 41, and the laser light reflected by the recording surface 43 travels back along the same path as that of the incident light and detects a variation in the polarized state conforming to the information recorded on the recording surface, thereby reading out the record. If at this time, the position of the recording surface 43 is varied by vibration or the like, right information cannot be read. Therefore, it is usually necessary to detect the position of the recording surface and effect automatic focus adjustment so as to ensure that the laser light is properly condensed on the recording surface, but heretofore the automatic focus adjustment has been effected by mechanical movement of the entire objective lens, and this has been poor in time responsiveness and also expensive.

In the present invention, by controlling the voltage applied to the cylindrical piezo element 22 in accordance with the detected focal length deviation signal by the construction as shown, the focal length of the objective lens itself comprising the lenses 41 and 42 is varied, whereby focus adjustment can be accomplished and thus, there is provided an automatic focal length adjusting mechanism which can effect high-speed response by a simple construction.

Also, as a method of positively making the most of the secondary influence of the deformation of the surface of the elastic member in the present invention, there is a method of constructing the elastic member such that the variation in refractive power by the deformation of the surface is opposite in direction to the variation in refractive power by the variation in the distribution of refractive power. For example, in FIG. 2, the refractive power of the distribution of refractive index pre-formed in the elastic member is made negative (A<0). By such a construction, the amount of variation in refractive power becomes small, but the fluctuation of spherical aberration and chromatic aberration can be greatly reduced.

The present invention, as described above, is designed to fluctuate the refractive power by utilization of the variation in the distribution of refractive index of the lens medium and therefore, there can be provided a variable focal length lens in which the variable amount of the refractive power is greater than in the conventional mechanism for uniformly varying the refractive index of the medium and the adverse effect of the complicated deformation of the refracting surface can be easily eliminated.

We claim:

1. A variable focal length lens comprising:
   a lens having a distribution of refractive index in which the refractive index varies in a direction perpendicular to the optic axis thereof, said lens comprising a deformable elastic member; and
   means for changing the shape of the distribution of refractive index by applying to said lens a force in the direction perpendicular to the optic axis to thereby deform said lens.

2. A variable focal length lens according to claim 1, wherein said elastic member has a distribution of refractive index approximated by a quadratic curve in the direction perpendicular to the optic axis.

3. A variable focal length lens comprising:
   a lens having a distribution of refractive index in which the refractive index varies in a direction perpendicular to the optic axis thereof, said lens comprising a deformable elastic member; and
   means for changing the shape of the distribution of refractive index by applying to said lens a force in a direction parallel to the optic axis to thereby deform said lens.

4. A variable focal length lens according to claim 3, wherein said elastic member has a distribution of refractive index approximated by a quadratic curve in the direction perpendicular to the optic axis.

5. A variable focal length lens comprising:
   a lens having a distribution of refractive index in which the refractive index varies in a direction perpendicular to the optic axis thereof, said lens comprising a deformable elastic member;
   means for changing the shape of the distribution of refractive index by applying a force to said lens for outside thereof to thereby deform said lens; and
   a liquid having a refractive index substantially equal to the refractive index of said lens, said lens being immersed in said liquid.

6. An optical element comprising:
   a deformable elastic member having a distribution of refractive index therein; and
   means for changing the shape of the distribution of refractive index by applying a force to said elastic member to thereby deform said elastic member, a direction of refraction of a light beam incident onto said elastic member being changed according to the change in the shape of the distribution of refractive index.

7. An optical element according to claim 6, wherein said changing means keeps light beam incidence and exit surfaces of said elastic member substantially constant.

8. An optical element according to claim 6, wherein said changing means changes at least one of the shapes of light beam incidence and exit surfaces of said elastic member and the direction of refraction of the light beam incident into said elastic member is further changed according to the change in the shape of the surface of said elastic member.

* * * * *

UNITED STATES PATENT AND TRADEMARK OFFICE
CERTIFICATE OF CORRECTION

PATENT NO. : 4,712,882

DATED : December 15, 1987

INVENTOR(S) : TAKESHI BABA, ET AL.

It is certified that error appears in the above-identified patent and that said Letters Patent is hereby corrected as shown below:

<u>Column 6</u>, line 28, "for" should read --from--;

line 51, "into" should read --onto--.

Signed and Sealed this

Seventh Day of June, 1988

Attest:

DONALD J. QUIGG

*Attesting Officer*  *Commissioner of Patents and Trademarks*